No. 627,976. Patented July 4, 1899.
D. C. BUSHNELL.
CULTIVATOR.
(Application filed Jan. 31, 1899.)
(No Model.) 3 Sheets—Sheet 2.
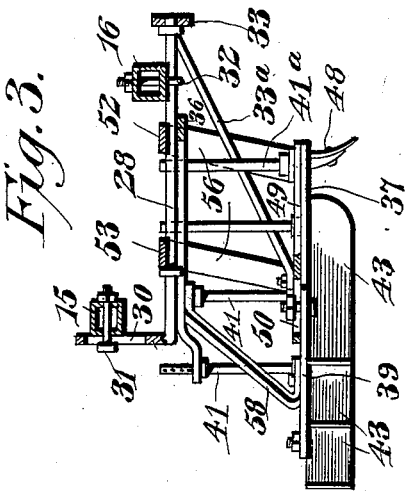
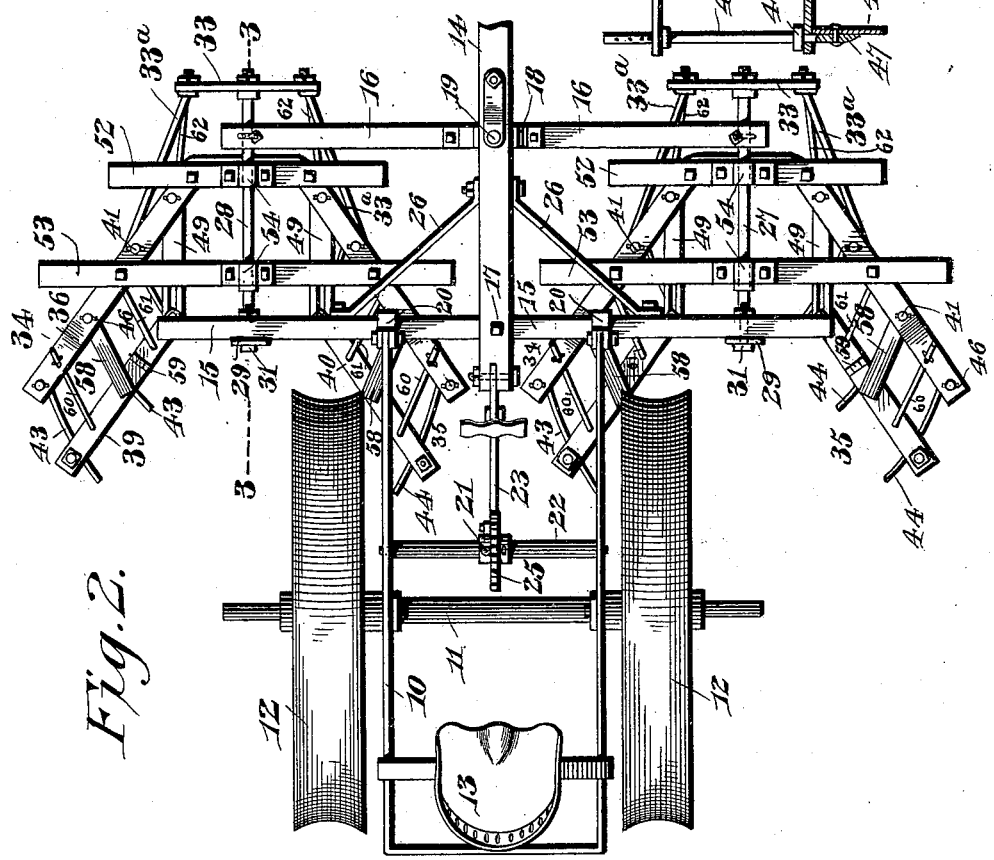
Witnesses
D. C. Bushnell Inventor
By his Attorneys, No. 627,976. Patented July 4, 1899.
D. C. BUSHNELL.
CULTIVATOR.
(Application filed Jan. 31, 1899.)
(No Model.) 3 Sheets—Sheet 3.
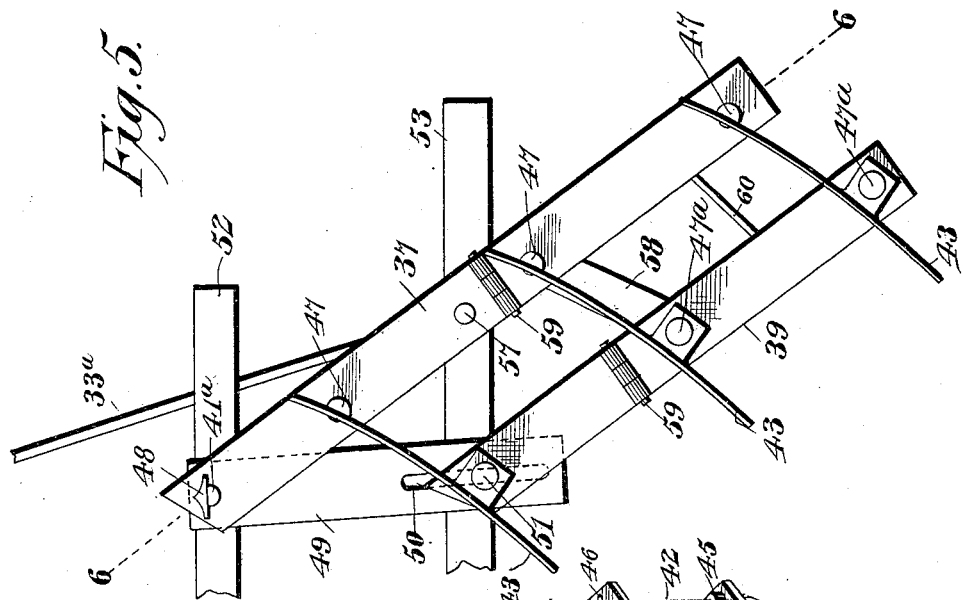
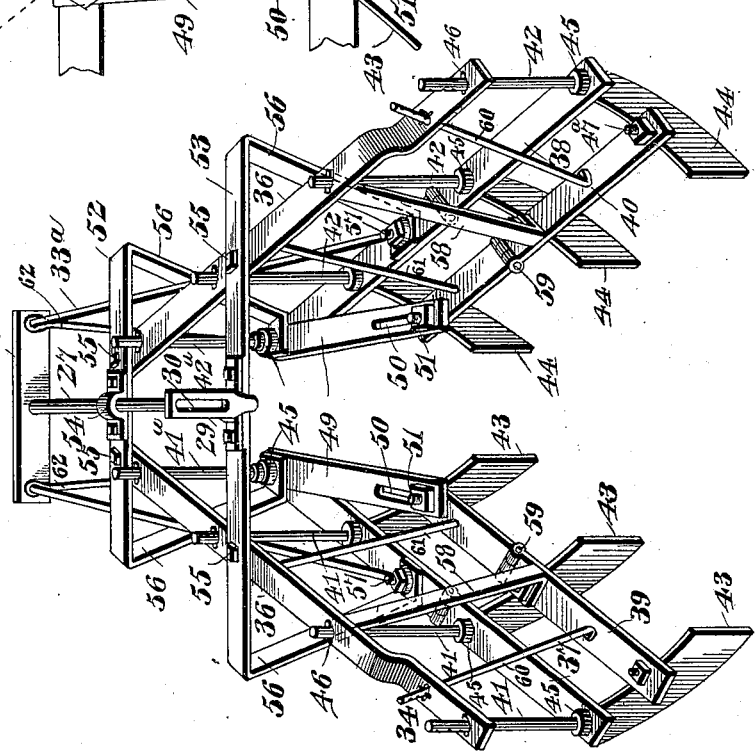
Witnesses.
Jas. K. McCathran
H. F. Bendorf
D. C. Bushnell Inventor
By his Attorneys.
C. A. Snow & Co.

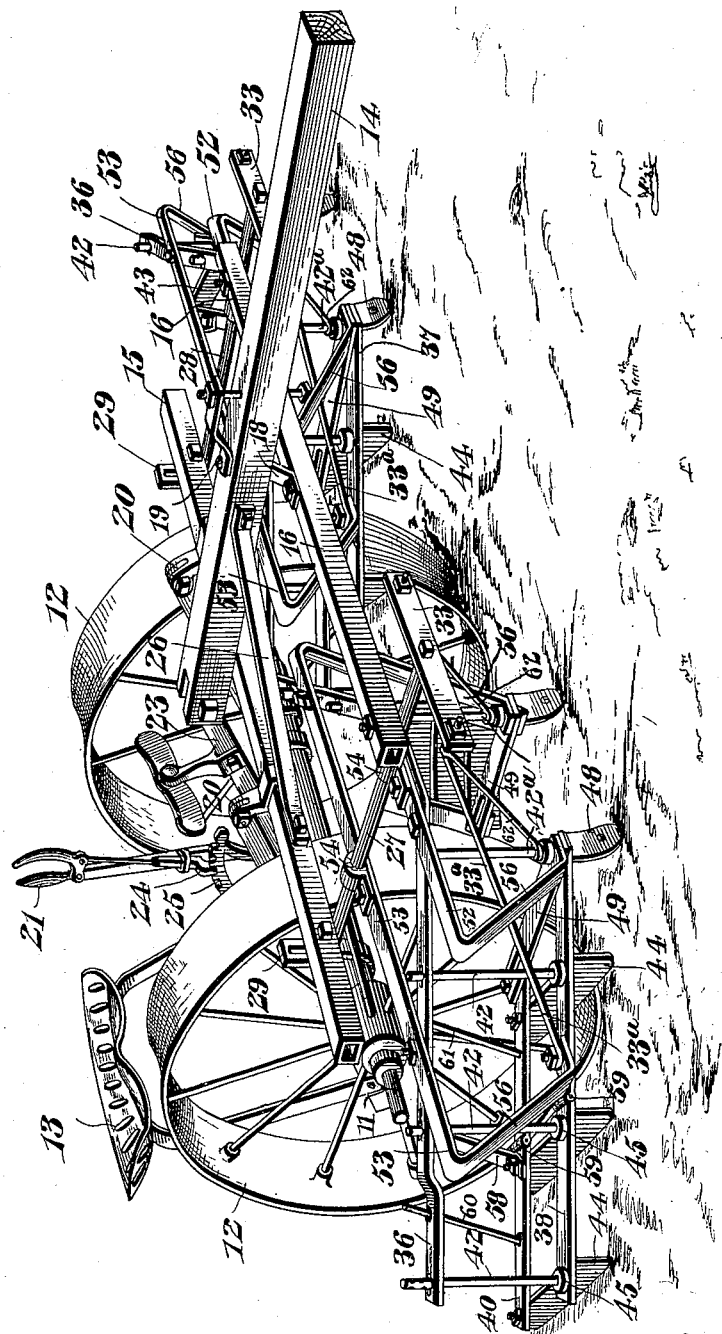

UNITED STATES PATENT OFFICE.

DAVID C. BUSHNELL, OF LADDONIA, MISSOURI.

CULTIVATOR.

SPECIFICATION forming part of Letters Patent No. 627,976, dated July 4, 1899.

Application filed January 31, 1899. Serial No. 703,994. (No model.)

*To all whom it may concern:*

Be it known that I, DAVID C. BUSHNELL, a citizen of the United States, residing at Laddonia, in the county of Audrain and State of Missouri, have invented a new and useful Cultivator, of which the following is a specification.

My invention relates to improvements in cultivators; and the prime object of the invention is to provide an implement especially designed for the cultivation of four rows at each trip across the field.

A further object of the invention is to provide an implement in which main earth-treating frames are each hung to swing freely on a horizontal axis to accommodate itself to the surface of the ground and to arrange the two series of shovels on each of said frames in a manner to throw the dirt in opposite directions, and thereby equalize the lateral pressure of the earth on the two series of shovels which lie on opposite sides of the axis of oscillation of the earth-treating frame.

A further object of the invention is to provide means by which the earth-treating frames may be raised or lowered at their rear ends, so as to change the horizontal position or relation of the frame to the ground, and thereby regulate the depth of penetration of the shovels.

A further object of the invention is to provide a novel construction by which the angle of the shovels forming each series of shovels may be changed to the line of draft without disturbing the position of the other series of shovels.

With these ends in view the invention consists in the novel combination of elements and in the construction and arrangement of parts, which will be hereinafter fully described and claimed.

To enable others to understand the invention, I have illustrated the same in the accompanying drawings, forming a part of this specification, and in which—

Figure 1 is a perspective view of a four-row cultivator constructed in accordance with my invention. Fig. 2 is a plan view thereof. Fig. 3 is a longitudinal sectional elevation on a plane through one of the hinge-rods of one of the main earth-treating frames, the plane of section being indicated by the dotted line 3 3 of Fig. 2. Fig. 4 is a detail perspective view of one of the main earth-treating frames removed from the implement. Fig. 5 is an inverted plan view of the frame represented by Fig. 4. Fig. 6 is a sectional view through the main earth-treating frame on the plane indicated by the dotted line 6 6 of Fig. 5.

Like numerals of reference denote like and corresponding parts in each of the several figures of the drawings.

The carrying-frame 10 of my implement is equipped with the transverse axle 11, on which are mounted the carrying-wheels 12, and this frame supports the standard of the driver's seat 13. The implement is designed to be drawn across the field by two or more draft-animals, and it is equipped with a centrally-arranged draft-tongue 14.

15 16 designate cross-beams, which are arranged at right angles to the tongue 14 and in parallel relation one to the other, and these cross-beams are secured firmly to the draft-tongue at points intermediate of the length of the latter. As shown by the drawings, the rear cross-beam 15 is made fast with the draft-tongue by one or more vertical bolts 17, but the front cross-beam 16 is equipped with a clip 18, which is made fast with said beam 16 and arranged so as to embrace the draft-tongue 14, the clip and tongue being united firmly together by a transverse bolt 19.

The rear end of the draft-tongue extends into the carrying-frame 10 in order to bring the rear cross-beam 15 into close relation to the front end of the carrying-frame 10, and this frame and the cross-beam 15 are hingedly connected directly together by any suitable type of hinges 20. The hinged connections between the carrying-frame and the rear cross-beam 15 are disposed on opposite sides of the draft-tongue, and this tongue may be adjusted vertically by means of a lever 21, which is mounted on a fulcrum-rod 22, that is supported in the carrying-frame 10. Said lever has a link connection 23 with the rear extremity of the draft-tongue, and the lever is furthermore provided with a latch 24, that is adapted to engage with a segment 25, which is fixed on the carrying-frame 10. To brace the rear cross-beam, which has the hinged connection with the carrying-frame, I provide the stay-rods 26, which have their front ends secured firmly to the draft-tongue 14 and are made fast at their rear ends with the cross-beam 15 at points contiguous to the hinge connections 20.

27 28 designate the hinge bars or rods for the two earth-treating frames of my cultivator, and these bars or rods are arranged on opposite sides of the draft-tongue parallel thereto. The hinge bars or rods are supported by the cross-beams 15 16, so as to be adjustable with the tongue when the latter is raised and lowered by the adjusting-lever 21, and from these hinge-rods are suspended the earth-treating frames, as will presently appear, whereby said frames are adjustable with the draft-tongue for the purpose of throwing the shovels of said frames into or out of active relation with the ground. Each hinge-rod is mounted on the outer end of the beams 15 16 in a manner to secure a vertical adjustment of the hinge-rod independently of the adjustment given to said rod by raising and lowering the draft-tongue 14 under the influence of the lever 21. This independent adjustment of the hinge-rod is attained by providing its rear end with an upturned arm 29, which is slotted longitudinally at 30 and is fastened adjustably to the cross-beam 15 by a bolt 31, which passes through said beam and the slotted arm of the hinge-rod. Each hinge-rod is supported at a point intermediate of its length on the front cross-beam 16 by means of a clip or hooked bolt 32, which is fastened to the end of the beam 16 and engages firmly with the hinge-rod. The front end of this hinge-rod is extended or prolonged in front of the beam 16 for the reception of a cross bar or head 33, which is secured firmly to the hinge-rod and is stayed in place by means of the braces 33ª, which are extended rearwardly and downwardly from the cross-head, so as to be united firmly to the lower members of the earth-treating frame, and from the forward end of the latter a brace 62 extends diagonally upward to the cross-bar 33.

34 35 designate the earth-treating frames, which are disposed on opposite sides of the draft-tongue and are loosely suspended from the hinge-rods 27 28, each frame being connected separately with one of the hinge-rods, so as to sway freely thereon and accommodate itself to the surface of the ground. The earth-treating frames are substantially the same in construction, and a description of one will answer for the other. Each frame consists of an upper V-shaped member 36, which is arranged in a horizontal position immediately below the hinge-rod, two lower front members 37 38, two lower rear members 39 40, two series of posts 41 42, and two series of shovels 43 44. The lower front members 37 38 of each frame are immediately below and parallel with the branches or legs of the V-shaped upper member 36, and said lower frame members 37 38 are spaced apart at their inner contiguous ends, as clearly shown by Fig. 4. The lower front member 37 is united to one branch or leg of the V-shaped member 36 by a series of posts 42, and the other frame member 38 is united to the other branch or leg of the V-shaped member 36 by the series of posts 42. The lower rear members of the frame 39 40 lie in the horizontal plane of the lower front members 37 38, and the members 37 39 are thus disposed parallel to each other, while the members 38 40 occupy like relation one to the other. The series of shovels 43 are connected with the frame members 37 39, so as to span the space between the same, while the other series of shovels 44 are connected with the members 38 40. The two series of shovels 43 44 are arranged oblique of the line of draft, and said shovels 43 are inclined in reverse positions to the series of shovels 44. The reversely-inclined double series of shovels lie on opposite sides of the vertical plane of the hinge-rod which constitutes the axis of oscillation of the loosely-hung main frame, and these two series of shovels are spaced apart a proper distance for the purpose of operating in the spaces between the two adjoining rows of plants. Each post of the series of posts 41 42 is provided near its lower end with a collar 45, which is adapted to rest upon the lower front frame member 37 or 38, and near its upper end the post is provided with keys, nuts, or other equivalent devices 46, that serve to secure the upper end of the post to a branch of the V-shaped frame member 36. The lower end of each post is extended through the lower front frame member for the purpose of attaching the same, as at 47, to the front end of one of the shovels 43 or 44, and the rear end of each shovel is equipped with a bolt 47ª, which is attached to the lower rear frame member 39 or 40. The front posts 41ª or 42ª of the series of posts are equipped with the ordinary cultivator-shovels 48.

The pair of lower front and rear frame members are connected adjustably together by means of a brace-plate 49, the front end of which is fitted loosely on one of the front posts, as 41ª or 42ª. The rear end of this brace-plate 49 is provided with a longitudinal slot 50, which is adjustably fastened by a bolt 51 to the lower rear member of the frame. It will be noted that each pair of lower frame members are connected by the shovels, which are fastened at their front ends to the posts and are connected at their rear ends by individual bolts to the rear frame member, and the two frame members are furthermore united by the brace-plate 49, whereby the rear frame member may be adjusted toward or from the front frame member for the purpose of changing the obliquity of the shovels to the line of draft.

The hinge connection between the main earth-treating frame and the hinge-rod is effected by the employment of brace-bars 52 53, which are arranged one in rear of the other across the V-shaped upper member 36 of said frame. Each brace-bar is looped at its middle, as at 54, for the purpose of loosely embracing the hinge-rod, and the brace-bar is fastened firmly to the frame member 36 by the bolts 55. The ends of the brace-bar are extended beyond the legs of the frame 36 and then carried downwardly to form the arms 56, which are bolted firmly at 57 to the lower front members 37 39 of the earth-treating frame. A brace 58 is arranged between the lower rear member and one leg of the upper V-shaped member of each frame, and this brace has its opposite ends secured firmly to the two frame members in any approved way. The draft appliances for two or three draft-animals may be of any suitable construction and connected to the implement in the proper manner.

From the foregoing description, taken in connection with the drawings, it will be observed that my implement contemplates the provision of two main frames disposed on opposite sides of the draft-tongue and each frame carrying two series of shovels, which are arranged in reversely-inclined positions and are disposed oblique to the line of draft, whereby the implement is equipped with four series of shovels adapted to operate on as many rows of plants during each trip of the machine across the field. The main frames are carried by devices on a tongue, which insures the adjustment of the frames with the tongue for the purpose of raising the shovels out of the ground; but at the same time each frame is hung to sway freely and the suspension device for each frame is mounted to raise or lower the rear part of the frame, so as to vary its position with relation to the ground-line, and thereby regulate the depth of penetration of the shovels.

I prefer to make the pair of lower frame members 37 39 or 38 40 of each earth-treating frame in sections, which are hinged or pivoted together, as at 59, (see Fig. 5,) whereby the two outer shovels of the series of shovels may be dropped to lower positions than the inner shovel or shovels of said series.

The inner side of the rear hinged part of each lower earth-treating frame is provided with a brace-rod 60, which passes obliquely through an opening formed through the respective upper frame member 36 to permit of the adjustment of the hinged portion. A rigid brace-rod 61 extends from the forward part of the lower earth-treating frame obliquely upward to the member 36.

Changes in the form, proportion, and the minor details of construction within the scope of the appended claims may be resorted to without departing from the spirit or sacrificing any of the advantages of this invention.

Having thus described the invention, what I claim is—

1. In a cultivator, the combination with a wheeled frame and a draft-tongue, of earth-treating frames connected to the wheeled frame and lying on opposite sides of the draft-tongue, each earth-treating frame having inclined members which diverge rearwardly, and said frame members provided with a plurality of shovels each of which crosses said frame members, said shovels lying obliquely to the line of draft, for the purpose described, substantially as set forth.

2. In a cultivator, the combination with a wheeled frame and a draft-tongue, of main earth-treating frames disposed on opposite sides of the tongue and each carrying two series of shovels, each main frame being loosely hung or suspended from the tongue by devices situated in a vertical plane between the two series of shovels on said frame, substantially as described.

3. In a cultivator, the combination with a wheeled frame, and a draft-tongue, of hinge bars or rods disposed on opposite sides of the draft-tongue, and earth-treating frames loosely connected with said hinge-bars and each carrying two series of shovels which are disposed obliquely to the line of draft, substantially as described.

4. In a cultivator, the combination with a wheeled frame, and a draft-tongue, of cross-beams fixed to said tongue and connected with the wheeled frame, hinge-rods attached to said cross-beams and disposed on opposite sides of, and parallel to, the draft-tongue, and earth-treating frames loosely mounted on the hinge-rods to be suspended thereby from the cross-beams and each frame carrying two series of shovels, substantially as described.

5. In a cultivator, the combination with a wheeled frame, a tongue, and the cross-beams on said tongue, of hinge-rods fastened to the cross-beam for adjustment vertically thereon, and earth-treating frames suspended from the hinged rods to be adjustable therewith and free to sway thereon, substantially as described.

6. In a cultivator, the combination with a wheeled frame, a draft-tongue, and cross-beams fast with said tongue, of hinge-rods each fastened at one end to one beam and having at its rear end an angular arm which is adjustably fastened to the other beam, and earth-treating frames loosely suspended from the hinge-rods at points within the connections between said rods with the cross-beam, substantially as described.

7. In a cultivator, an earth-treating frame consisting of an upper member, two pairs of lower members inclined reversely to each other, posts connecting the upper frame member with the two lower front frame members, and the two series of shovels connected to the lower frame members to span the spaces between the same, substantially as described.

8. In a cultivator, a main earth-treating frame consisting of an upper V-shaped frame member, two pairs of lower frame members each pair of which has its parts parallel one to the other, the two series of posts connecting the upper frame member with the front lower members, the two series of shovels adjustably attached to the two pairs of lower frame members, and adjustable braces between the two pairs of lower frame members, substantially as described.

9. In a cultivator, a main earth-treating frame comprising the V-shaped upper member, 36, the reversely-inclined lower front members, 37, 38, united firmly to the legs of the upper frame member, the rear lower frame members, 39, 40, disposed in the horizontal plane of the front lower members and arranged parallel therewith, the two series of shovels which span the spaces between the two pairs of lower members and are inclined reversely to each other, and a brace-plate loosely connected to each lower front member and adjustably attached to the lower rear member, substantially as described.

10. In a cultivator, an earth-treating frame consisting of an upper V-shaped member, lower shovel-carrying members united with the branches of the upper member, and transverse brace-bars fastened to the upper frame member and having the arms which are united to the lower frame members, in combination with a hinge-rod on which the transverse braces are loosely fitted, and means for supporting the hinge-rod, substantially as described.

11. In a cultivator, the combination with a wheeled frame, and a draft-tongue, of cross-beams fast with said tongue and having hinged connection with said frame, means for adjusting the tongue to change its horizontal relation with the wheeled frame, hinge-rods supported by the cross-beams on opposite sides of the tongue, and earth-treating frames suspended from said rods and each carrying two series of shovels which are disposed obliquely to the line of draft, substantially as described.

In testimony that I claim the foregoing as my own I have hereto affixed my signature in the presence of two witnesses.

DAVID C. BUSHNELL.

Witnesses:
THOS. B. HAMMETT,
ROBERT GRAINGE.